Patented Mar. 2, 1954

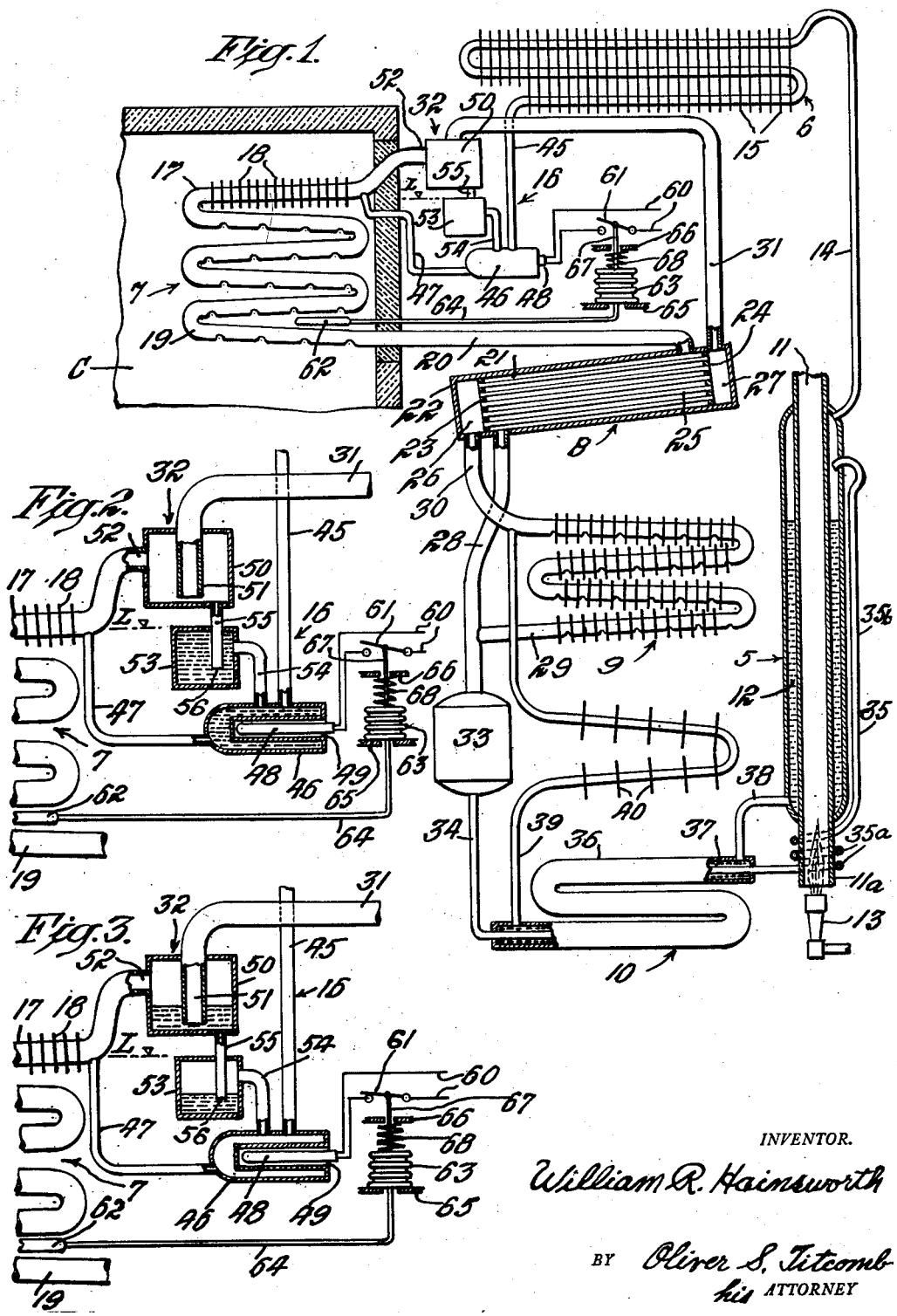

2,670,606

UNITED STATES PATENT OFFICE 2,670,606

DEFROSTING ARRANGEMENT

William R. Hainsworth, Puente, Calif., assignor to Servel, Inc., New York, N. Y., a corporation of Delaware Application August 16, 1952, Serial No. 304,771

9 Claims. (Cl. 62—5)

1

The present invention relates to refrigeration and more particularly to a defrosting arrangement for an absorption refrigeration system of the type utilizing an auxiliary inert gas into which refrigerant evaporates and diffuses at partial pressure.

One of the objects of the present invention is to provide a defrosting arrangement in an absorption refrigeration system of the type indicated which utilizes the fluids therein during operation of the system to defrost the evaporator in as short a period of time as practical.

Another object of the invention is to provide a defrosting arrangement for vaporizing liquid refrigerant from the condenser by the application of heat and delivering the hot vapor directly into the evaporator.

Another object is to provide a defrosting arrangement for an absorption refrigeration system of the type indicated which simultaneously delivers hot refrigerant vapor to the evaporator and stops the circulation of gas in the gas circuit.

Still another object is to provide a defrosting arrangement of the type indicated which is of simple and compact construction, economical to manufacture and reliable in operation.

These and other objects will become more apparent from the following description and drawing in which like reference characters denote like parts throughout the several views. It is to be expressly understood, however, that the drawing is for the purpose of illustration only and not a definition of the limits of the invention, reference being had for this purpose to the appended claims. In the drawing:

Fig. 1 is a diagrammatic view of a three-fluid absorption refrigeration system incorporating the defrosting arrangement of the present invention;

Fig. 2 is an enlarged view of the defrosting arrangement showing the closed trap in the refrigerant circuit through which refrigerant flows from the condenser to the evaporator and the open trap in the gas circuit through which gas flows to the evaporator; and Fig. 3 is a view similar to Fig. 2 showing the heater energized to deliver hot refrigerant vapor from the trap in the refrigerant circuit to the evaporator and force liquid into the trap in the gas circuit.

The defrosting arrangement of the present invention is particularly adapted for use in absorption refrigeration systems utilizing an auxiliary pressure equalizing gas. Such refrigeration systems comprise a refrigerant circuit for delivering liquid refrigerant to an evaporator,

2 a gas circuit for delivering inert gas to the evaporator in which the refrigerant diffuses at partial pressure to produce a refrigerating effect, and an absorption solution circuit in which the refrigerant vapor is absorbed and expelled. For the purpose of illustration, the defrosting arrangement of the present invention is shown applied to a refrigeration system generally similar to that illustrated and described in United States Letters Patent to Alvar Lenning 2,300,579 issued November 3, 1942, and entitled Refrigeration. The absorption refrigeration system illustrated comprises a generator 5, a condenser 6, an evaporator 7, a gas heat exchanger 8, an absorber 9, and liquid heat exchanger 10 interconnected for the circulation of refrigerant, absorbent and auxiliary pressure equalizing gas.

Generator 5 is in the form of an upright cylindrical vessel having a central or axial flue 11 providing an annular chamber 12 therebetween for absorption solution. Flue 11 is heated by radiant heat and the products of combustion from a fuel burner 13 controlled in any suitable way, not shown. The top of the annular chamber 12 of generator 5 is connected to the upper end of condenser 6 by a vapor pipe 14.

Condenser 6 is preferably air cooled and as illustrated comprises a vertically arranged serpentine coil having spaced heat transfer fins 15. The lower or outlet end of condenser 6 is connected to the top of evaporator 7 through conduit means 16 forming a liquid trap, later to be described in detail.

Evaporator 7 is also illustrated in the form of a vertically arranged serpentine coil, but it will be understood that it may be formed to provide a high temperature box cooling section 17 having heat transfer fins 18 and a low temperature ice freezing or cold storage section 19 which may be enclosed to form a compartment having shelves mounted on the individual turns of the coil. The evaporator 7 is usually located in a cabinet C to be refrigerated and the remainder of the apparatus is located at the exterior of the cabinet. The lower end of evaporator 7 is connected by a conduit 20 to one end of chamber 21 of gas heat exchanger 8 constituting one path of flow for the pressure balancing inert gas.

The gas heat exchanger 8 is formed by a cylindrical shell 22 having closed ends and spaced tube sheets 23 and 24 therein forming the chamber 21 therebetween. Tubes 25 extend through the chamber 21 between the tube sheets 23 and 24. The space between the tube sheets 23 and 24 and the ends of shell 22 constitute headers 26 and 27 which together with the tubes 25 constitute a second path of flow for the pressure balancing inert gas in heat exchange with the gas in chamber 21. Depending from the opposite end of chamber 21 of gas heat exchanger 8 is a conduit 28 connected to the lower end of absorber 9.

Absorber 9 is also illustrated in the form of a vertically arranged serpentine coil having its lower end 29 connected to conduit 28 and its upper end 30 connected to header 26 of gas heat exchanger 8. The opposite header 27 of gas heat exchanger 8 is connected by a conduit 31 to the upper end of evaporator 7 and the conduit incorporates a flow control device 32, later to be described in detail. The lower end of depending conduit 28 is connected to the top of an absorber pot 33 below the absorber 9 and the bottom of the absorber pot is connected to the generator 5 by a conduit 34.

Conduit 34 constitutes the inner passage of liquid heat exchanger 10 and a vapor liquid-lift 35. The lift comprises several turns $35_a$ of conduit 34 wound around a depending portion $11_a$ of flue 11 and an upright portion $35_b$ with its end connected to the chamber 12 of the generator 5 adjacent the top thereof. Surrounding the conduit 34 is a sleeve 36 constituting a second passage 37 of the liquid heat exchanger 10. A pipe 38 connects the lower end of a generator chamber 12 to one end of the outer sleeve 36 and the opposite end of the sleeve is connected to the upper end or top of absorber 9 by a riser 39. As illustrated, riser 39 has a hairpin bend with heat transfer fins 40 thereon.

Heat from fuel burner 13 is transferred through the wall of the flue 11 to the solution in chamber 12 to expel refrigerant vapor therefrom. The refrigerant vapor flows through vapor pipe 14 to condenser 6 where it is condensed to a liquid and the liquid refrigerant flows through the conduit means 16 to the top of the evaporator 7. Simultaneously, absorption solution weak in refrigerant flows by gravity from the chamber 12 of generator 5 to the top of absorber 9 in a path of flow comprising the outer passage 37 of liquid heat exchanger 10 and conduit 39. Absorption solution flowing downwardly through the absorber 9 absorbs refrigerant vapor from the inert gas in which it is diffused and the lighter gas tends to rise and flow upwardly through the absorber into the header 26 of gas heat exchanger 8, then through the tubes 25 to the header 27 and from the latter through the conduit 31 into the top of the evaporator 7. The liquid refrigerant flowing downwardly through evaporator 7 evaporates and diffuses into the pressure equalizing gas at partial pressure to produce a refrigerating effect and the heavier mixture of refrigerant and gas flows downwardly into the chamber 21 of the gas heat exchanger 8. The gas laden with refrigerant vapor flows through the chamber 21 in heat exchange relation with the gas weak in refrigerant flowing through the tubes 25 of gas heat exchanger 8 and through conduit 28 into the bottom of the absorber 9. Thus, circulation of the pressure equalizing gas is initiated by the differential weights of columns of gas strong in refrigerant and gas weak in refrigerant in the gas circuit. Absorption solution rich in refrigerant flows from the lower end 29 of absorber 9 into the absorber pot 30 and from the latter through the conduit 34. The absorption solution in the coils $35_a$ wrapped around the depending extension $11_a$ of flue 11 is heated to expel refrigerant vapor and the expelled vapor lifts the solution in the upright portion $35_b$ of conduit 34 into the chamber 12 of the generator 5. Thus, the refrigeration system has a refrigerant circuit comprising the condenser 6 and evaporator 7 and a gas circuit comprising the evaporator 7. As thus far described, the absorption refrigeration system is substantially identical with that illustrated and described in the Lenning patent, referred to above.

In accordance with the present invention a defrosting arrangement is provided for heating the liquid refrigerant in the conduit means 16 between the condenser 6 and evaporator 7 while the refrigeration system is in operation and delivering the hot refrigerant vapor directly into the evaporator. The invention also utilizes vapor expelled in the conduit means 16 in the refrigerant circuit to operate the flow control device 32 in the gas circuit to stop the flow of gas therein.

The conduit means 16 in the refrigerant circuit between the condenser 6 and evaporator 7 comprises a pipe 45 depending from the lower end of the condenser and connected to the top of a relatively small heating chamber 46 located below the top of the evaporator 7. Heating chamber 46 is connected to the top of evaporator 7 by an upwardly extending pipe or riser 47. A suitable heating element 48 such as the electric unit shown is arranged in thermal contact with the heating chamber 46 and as illustrated, the heating element is located in a well or recess 49 in the chamber. Heating element 48 has a heating capacity sufficient to vaporize liquid refrigerant as fast as it is delivered from the condenser 6. Thus, the depending pipe 45, chamber 46 and riser 47 constitute a liquid trap through which liquid refrigerant flows from the condenser 6 to the evaporator 7 during normal operation of the system. The heating chamber 46 is located at the bottom of the liquid trap and which the heater 48 is energized all of the refrigerant is vaporized as fast as it is delivered from the condenser and hot vapor flows through riser 47 into the evaporator 7.

The flow control device 32 in conduit 31 of the gas circuit also is in the form of a trap having a chamber 50. The chamber 50 is located above the heating chamber 46 and the bottom of the chamber is located above the level L at which the riser 47 is connected to the top of the evaporator coil 7. Conduit 31 projects downwardly through the top of chamber 50 with its end 51 terminating a slight distance above the bottom of the chamber. A conduit 52 connects the side of the chamber 50 above the terminal end 51 of conduit 31 to the upper end of the evaporator coil 7. Between the chambers 46 and 50 in the refrigerant and gas circuits, respectively, is a vessel 53. A conduit 54 connects the top of the heating chamber 46 to the side of the vessel 53 below the level L. A second conduit 55 depends from the bottom of chamber 50 through the top of the vessel 53 with its lower end 56 terminating below the connection of conduit 54 with the side thereof and adjacent the bottom of the vessel. It is to be noted that the level L is located between the bottom of the chamber 50 and the top of vessel 53. Riser conduit 47 may have a restricting orifice therein or may be of a diameter to freely pass liquid refrigerant as it is delivered from the condenser 6 but small enough to throttle the flow of refrigerant vapor so as to produce a low pressure head in the heating chamber 46.

Heating of the chamber 46 may be controlled manually or automatically. In the illustrated embodiment, the electric heating element 48 is connected to a source of current 60 and the energization and deenergization of the element is controlled by a switch 61. Switch 61 may be operated manually, but in the preferred arrangement illustrated it is operated by a thermostat responsive to the accumulation of frost or ice on the evaporator coil 7. For the purpose of illustration, the thermostat is shown as comprising a bulb 62, a bellows 63 and a tube 64 connecting the bulb and bellows. The bellows 63 is located between abutments 65 and 66 and the free end of the bellows is connected to the switch 61 by a pushrod 67. A spring 68 is located between the abutment 66 and movable side of the bellows. The bulb 62 is preferably located between turns adjacent the bottom of the evaporator coil 7 or may be spaced from one section of the coil a distance equal to the thickness of frost which is allowed to accumulate on the coil. The bulb 62 and bellows 63 contain a suitable fluid which expands the bellows 63 at the ambient temperature around the coil to hold the switch 61 in open position but permits spring 68 to compress the bellows and close the switch when the bulb is contacted by frost on the coil. One form of the invention having now been described in detail, the mode of operation is explained as follows:

During normal operation of the refrigeration system, liquid refrigerant from the condenser 6 flows through conduit means 16 constituting a liquid trap and formed by the depending pipe 45, heating chamber 46 and riser 47. When liquid refrigerant rises to the level L it first fills conduit 54 and vessel 53 and then overflows from the trap into the top of the evaporator 7. Simultaneously, gas from the heat exchanger 8 flows through the conduit 31 into the chamber 50 of the flow control device 32 and conduit 52 into the upper end of the evaporator 7. The liquid refrigerant then flows downwardly through the evaporator coil 7 by gravity and evaporates and diffuses into the gas at a partial pressure to produce a low temperature in the evaporator. The evaporation of refrigerant at partial pressure produces a temperature in evaporator 7 below freezing so that after a period of time frost will have accumulated on the exterior of the evaporator coil until it contacts bulb 62 of the thermostat. Cooling of the bulb 62 permits contraction of the bellows 63 by the spring 68 to close the switch 61 and energize the heating element 48.

Upon energization of the heating element 48 the refrigerant therein is vaporized in heating chamber 46. Hot refrigerant vapor then flows from chamber 46 through the riser 47 into the top of the evaporator 7. Riser 47 or an orifice therein restricts the flow of vapor from the heating chamber 46 to produce a pressure sufficient to cause a flow of vapor through the conduit 54 into the vessel 53. The transfer of pressure from heating chamber 46 to the top of the liquid in vessel 53 causes the liquid therein to be displaced and flow upwardly through the depending tube 55 into the chamber 50 of the flow control device 32 in the gas circuit. Liquid continues to be displaced from the vessel 53 into the chamber 50 from the level illustrated in Fig. 2 to the level illustrated in Fig. 3 and immerses the depending end 51 of conduit 31 to stop the flow of gas in the gas circuit. When no additional gas is supplied to the evaporator 7 the gas therein soon becomes saturated with refrigerant vapor so that all of the latent heat in the hot vapor is transmitted through the walls of the evaporator coil to melt the frost and ice thereon.

Defrosting of the evaporator 7 continues until all of the frost has been melted and the bulb 52 of the thermostat adjacent the bottom of the evaporator is subjected to the ambient temperature around the coil. At the increased temperature, the fluid in bulb 62 acting through the tube 64 and bellows 63 operates the push rod 67 to open the switch 61 and stop the defrosting cycle. Upon deenergization of the heating element 48 liquid refrigerant flows by gravity from the chamber 50 into the vessel 53 to open the gas circuit and liquid refrigerant from the condenser 6 flows into the chamber 46 and accumulates therein until it overflows into the top of evaporator 7. Due to the fact that the defrosting operation was performed during operation of the refrigeration system, liquid refrigerant from the refrigerant circuit and gas from the gas circuit are immediately available in the evaporator 7 to reestablish a refrigeration cycle. Normal refrigeration then continues until the frost again builds up on the evaporator coil 7 and a defrosting cycle is automatically repeated.

It will now be observed that the present invention provides a defrosting arrangement in an absorption refrigeration system of the three fluid type for defrosting the evaporator and reestablishing refrigeration in as short a period of time as possible. It will also be observed that the present invention provides a defrosting arrangement for vaporizing liquid refrigerant from the condenser and delivering the hot vapor directly to the evaporator. It will still further be observed that the defrosting arrangement of the present invention simultaneously supplies hot refrigerant vapor to and stops the circulation of pressure equalizing gas in the evaporator of the system.

While a single embodiment of the invention is herein illustrated and described, it will be understood that modifications may be made in the construction and arrangement of elements without departing from the spirit or scope of the invention. Therefore, without limitation in this respect, the invention is defined by the following claims.

I claim:

1. In an absorption refrigeration system of the three fluid type containing a refrigerant, an absorbent and an inert pressure equalizing gas and having a refrigerant circuit comprising a condenser and an evaporator and a gas circuit comprising the evaporator, the combination with such a refrigeration system of a defrosting arrangement comprising a liquid line in the refrigerant circuit through which refrigerant flows from the condenser to the evaporator, a liquid reservoir depending from a portion of the gas circuit, a connection between the liquid line in the refrigerant circuit and the liquid reservoir in the gas circuit, a heater for vaporizing refrigerant in the liquid line which flows through the connection to the reservoir vessel and forces liquid therefrom into the gas circuit to stop the flow of gas therein, and a control for starting and stopping operation of the heater.

2. In an absorption refrigeration system of the three fluid type having a refrigerant circuit comprising a condenser and an evaporator and a gas circuit comprising the evaporator, a defrosting arrangement comprising a liquid trap in the refrigerant circuit between the condenser and evaporator, a heater at the liquid trap for vaporizing liquid refrigerant from the condenser for flow to the evaporator to defrost the latter, a flow control device in the gas circuit above the liquid trap in the refrigerant circuit and operated by refrigerant vapor from the liquid trap to stop the flow of gas in the gas circuit, and a control for initiating operation of the heater whereby the refrigerant used for defrosting is immediately available for refrigeration at the termination of a defrosting period.

3. In an absorption refrigeration system of the three fluid type having a refrigerant circuit comprising a condenser and an evaporator and a gas circuit comprising the evaporator, a normally closed liquid trap in the refrigerant circuit through which liquid refrigerant flows from the condenser to the evaporator, a normally opened trap in the gas circuit through which a diffusing gas flows to the evaporator, a device utilizing vapor from the trap in the refrigerant circuit to deliver liquid into the trap in the gas circuit, and a heater to heat the trap in the refrigerant circuit for vaporizing the refrigerant from the condenser.

4. In an absorption refrigeration system of the three fluid type having a refrigerant circuit comprising a condenser and an evaporator and a gas circuit comprising the evaporator, a defrosting means comprising a liquid trap in the refrigerant circuit through which liquid refrigerant flows to the evaporator, a liquid trap in the gas circuit through which pressure equalizing gas flows to the evaporator, a heater for vaporizing the refrigerant in the liquid trap in the refrigerant circuit which flows to the evaporator, control means responsive to a frost condition on the evaporator for starting or stopping operation of the heater, a connection between the traps, and a device in the connection between the traps and operable in response to vapor from the liquid trap in the refrigerant circuit to close the trap in the gas circuit.

5. In an absorption refrigeration system of the three fluid type having a refrigerant circuit comprising a condenser and an evaporator and a gas circuit comprising the evaporator, a defrosting means comprising a liquid trap in the refrigerant circuit through which liquid refrigerant flows from the condenser to the evaporator, a liquid trap in the gas circuit located above the liquid trap in the refrigerant circuit, a heater for vaporizing the refrigerant in the liquid trap in the refrigerant circuit, a connection between the traps for draining liquid from the upper trap into the lower trap to open the gas circuit when the heater is not operating and said connection providing a path through which liquid flows into the upper trap to stop the flow of gas in the gas circuit when the heater is in operation.

6. In an absorption refrigeration system of the three fluid type having a refrigerant circuit comprising a condenser and an evaporator and a gas circuit comprising the evaporator, a defrosting arrangement comprising a liquid trap in the refrigerant circuit between the condenser and evaporator, a liquid trap in the gas circuit, a device connected to drain liquid from the trap in the gas circuit, a heater for vaporizing refrigerant in the liquid trap in the refrigerant circuit for flow to the evaporator, and a connection between the liquid trap in the refrigerant circuit and the device for delivering vapor to the device at the pressure in the liquid trap to force liquid from the device into the trap in the gas circuit.

7. In an absorption refrigeration system of the three fluid type having a refrigerant circuit comprising a condenser and an evaporator and a gas circuit comprising the evaporator, conduit means between the condenser and evaporator and connected to the latter at a particular outlet level, a liquid trap in the conduit means below the outlet level, a liquid trap in the gas circuit above the outlet level of the conduit means, a vessel between the traps, a conduit connecting the liquid trap in the refrigerant circuit to the vessel adjacent the top thereof, a conduit connecting the trap in the gas circuit to the vessel adjacent the bottom thereof, and a heater for vaporizing the liquid refrigerant in the liquid trap in the refrigerant circuit.

8. In an absorption refrigeration system of the three fluid type having a refrigerant circuit comprising a condenser and an evaporator and a gas circuit comprising the evaporator, conduit means between the condenser and evaporator, a liquid trap in the conduit means, conduit means above the liquid trap in the refrigerant circuit and connected to deliver pressure equalizing gas to the evaporator, a liquid trap in the gas conduit, connecting means between the traps in the refrigerant and gas circuits including a vessel, a conduit depending from the upper trap into the vessel, a conduit connecting the lower trap to the vessel above the end of the depending conduit, and a heater for vaporizing the refrigerant in the trap in the refrigerant circuit.

9. In an absorption refrigeration system of the three fluid type comprising a refrigerant circuit and a gas circuit, a liquid trap in the gas circuit comprising a flow control vessel, an inlet pipe having its end adjacent the bottom of the vessel and an outlet pipe connected to the vessel above the end of the inlet pipe, a reservoir vessel below the trap, a tube depending from the bottom of the flow control vessel into the reservoir vessel, a vapor pipe connected to the reservoir vessel above the lower end of the depending tube, and means for delivering vapor under pressure through the vapor pipe to the reservoir vessel to force liquid therefrom through the depending tube into the flow control vessel to seal the inlet pipe and stop the flow of gas in the gas circuit.

WILLIAM R. HAINSWORTH.

References Cited in the file of this patent

UNITED STATES PATENTS

| Number | Name | Date |
|---|---|---|
| 1,846,626 | Altenkirch | Feb. 23, 1932 |
| 2,181,376 | Lynger | Nov. 28, 1939 |
| 2,181,528 | Widell | Nov. 28, 1939 |
| 2,290,509 | Ullstrand | July 21, 1942 |
| 2,468,104 | Philipps | Apr. 26, 1949 |
| 2,484,669 | Backstrom | Oct. 11, 1949 |